Oct. 11, 1927.
O. F. HAIBE
HIGH POWER CYLINDER HEAD
Filed June 8, 1925
1,645,423
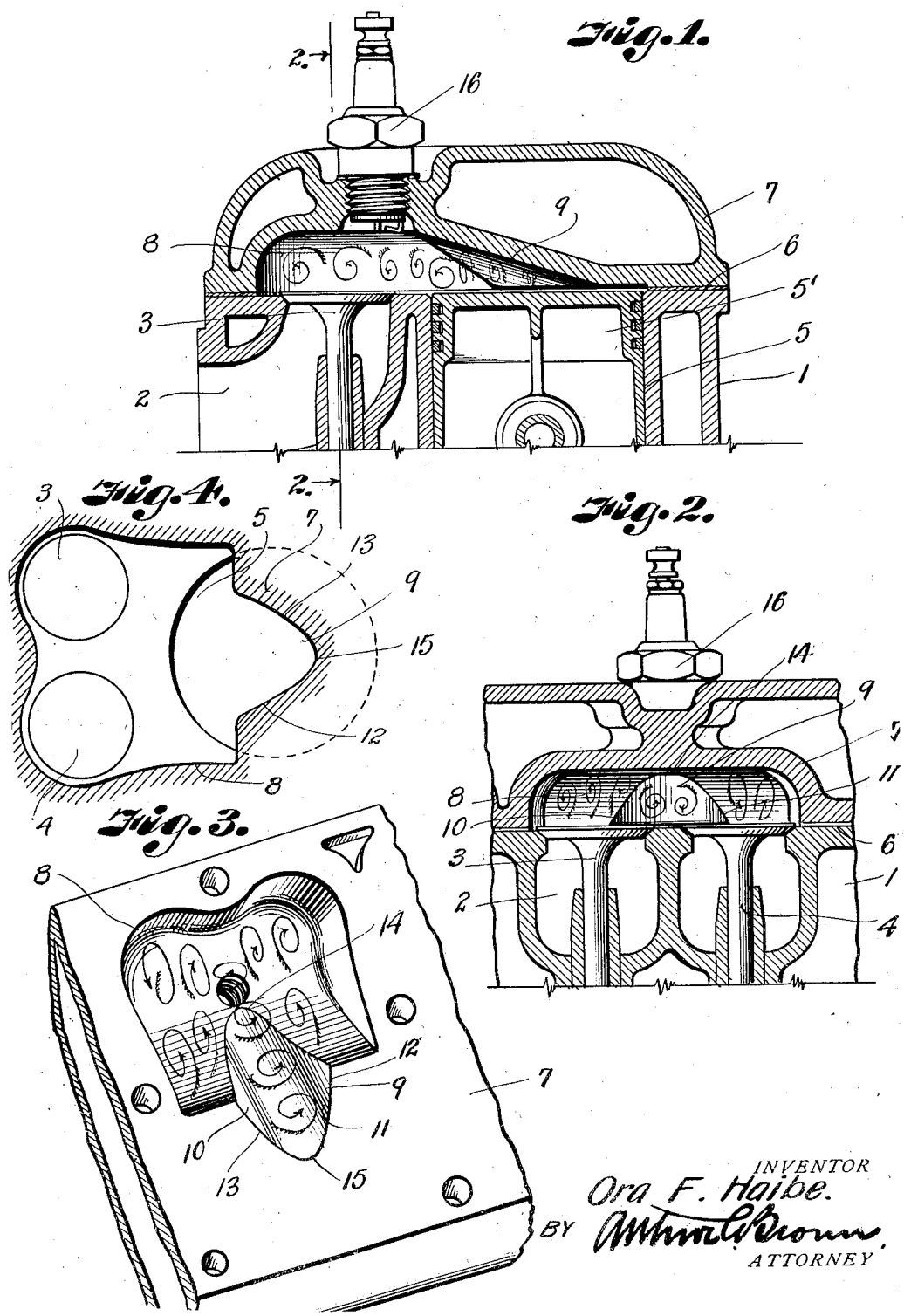
INVENTOR
Ora F. Haibe.
BY
ATTORNEY Patented Oct. 11, 1927.

1,645,423

UNITED STATES PATENT OFFICE.

ORA F. HAIBE, OF KANSAS CITY, MISSOURI, ASSIGNOR, BY DIRECT AND MESNE ASSIGNMENTS, OF ONE-HALF TO D. H. HAIBE AND ONE-HALF TO FRANK ELLIOTT, BOTH OF KANSAS CITY, MISSOURI.

HIGH-POWER CYLINDER HEAD.

Application filed June 8, 1925. Serial No. 35,659.

This invention relates to internal combustion engines, and the primary object thereof is to provide means whereby a thorough, intimate, intermingling of the constituents of the hydrocarbon fuel mixture will be assured before it enters the combustion chambers of the cylinders, to thereby increase the combustible efficiency of the engine.

Another object of the invention is to provide means whereby there will be practically a complete displacement of the spent gases from the cylinders to approach perfect scavenging so that incoming, fresh charges will not be diluted by products of combustion trapped in the cylinders.

In internal combustion engines of the four cycle type having valves placed in side pockets and operating on constant volume and constant compression, it is difficult to distribute the fuel charge equally to the cylinders. so the carburetor is usually set at a compromise between a rich mixture for one pair of cylinders and a lean mixture for another pair, with a tendency to a rich mixture in order to facilitate starting and for low speed performance. The objection to such practice is that one pair of cylinders usually receives too rich a mixture, which hampers lubrication, causes formation of carbon, fouls plugs, and on account of unequal distribution of the fuel charge into the several pairs of cylinders, causes vibration and power loss.

Observation of the passage of the fuel mixture through a glass manifold will indicate that there is a definite spiral action of the liquid fuel which adheres to the inner wall of the manifold and to the cylinder walls. This spiral stream does not travel within fixed limits, but varies with practically every change in speed, throttle and load conditions, thus bringing about the unequal quantitative distribution above referred to.

Theoretically, carburetors are supposed to vaporize the fuel that passes through them. Actually, however, the carburetor acts more as a separator, vaporizing the lighter ends of the hydrocarbon content of the fuel mixture, while the heavier ends enter the cylinders as liquid unsusceptible to combustible pressures, so that they do not ignite at all or they are combusted too late during the expansion stroke of the piston to be efficient. They do, however, form carbon on the cylinder-head, valves and pistons.

This invention aims to overcome or at least minimize the above objections, and to this end it consists in providing a head in which there is a turbulence-producing chamber and a super-turbulence-producing chamber between the intake port and the cylinder, the walls of which are so disposed that violent turbulence will be set up in the first chamber, adjacent the intake valve and increased, that is, super turbulence will be set up in the second chamber just before the charge enters the combustion chamber. This stepped up turbulence causes more even weights of charges to be drawn into the cylinders. They cause the unvaporized heavy ends (such as kerosene) to be thoroughly mixed with the lighter ends so that all the hydrocarbon content of the fuel mixture is combusted, resulting in maximum power and consequently, increased mileage per gallon of liquid fuel consumed. I have also found in actual practice that due to the uniformity of the introduced fuel charges in the several cylinders, vibration is materially reduced and in some cases as much as one-half that present in the standard L-head type engine.

The high degree of turbulence causes an even fuel charge to be drawn into the cylinder, thus reducing engine vibration and labor pound.

The atomizing and vaporizing effect which turbulence has upon the relatively heavy ends (heavy kerosene) of the present day fuel, admitted into the cylinders, increases the efficiency of the engine by speeding up the combustion of the fuel by mechanical distribution of the flame following ignition, and the scouring effect produced is effective in washing away the stagnant layer of gas adhering to the cylinder-head and cylinder walls.

The novelty of the invention will be clearly understood by reference to the following description in connection with the accompanying drawings, in which Fig. 1 is a vertical, longitudinal, sectional view through the upper part of a four cycle L-head type of internal combustion engine constructed in accordance with my invention.

Fig. 2 is a sectional view on the line 2—2 of Fig. 1.

Fig. 3 is a fragmentary perspective view of the head, and

Fig. 4 is a plan view of part of the engine block over one cylinder.

Referring now to the drawings by numerals of reference, 1 designates the engine block with an intake port 2, provided with an intake valve 3, there being an exhaust valve 4 of usual construction. The valve assembly (not shown) may be of such construction as will properly cause the opening and closing of the valves. The cylinder 5 and the piston 5' are also of standard construction. The upper end of the block 1 is flat as indicated at 6, to receive the head 7, constituting the subject matter of my invention. The head is provided with a dome-shaped turbulence chamber 8 immediately over the valves. The turbulence chamber communicates with a super-turbulence chamber 9 immediately over the piston 5. The super-turbulence chamber has a declining roof wall extending toward the piston and away from the turbulence chamber 8. The roof wall is relatively straight, with the side walls curved downwardly as indicated at 10 and 11. The super-turbulence chamber is preferably wider at its middle portion, the curved walls 10 and 11 providing a concave chamber or space, the curvature of the concave portion being at right angles to the direction of flow of the fuel passing from the turbulence chamber 8 so that the incoming fuel will first be agitated by turbulence created by the walls of the chamber 8 to effect an intimate co-mingling of the hydrocarbon constituents including the light and heavy ends, and then as the fuel enters the super-turbulence chamber it will be rolled upon itself at substantially right angles to its original direction of flow to effect more violent turbulence or intermingling of the hydrocarbon constituents. The super turbulence takes place directly over the piston, so the maximum turbulence is created in a zone substantially concentric with the piston to thereby insure approximately perfect combustion of the entire fuel mixture and to thereby increase the efficiency of the engine.

It is to be understood, of course, that the angle of declination of the roof portion 9 may be slightly varied, but I recommend the angle approximately 19 degrees from the horizontal, while the angle 12 and 13 at the ends of the super-turbulence chamber should be approximately 40 degrees, and the curved ends 14 and 15 of the super-turbulence chamber described on an arc approximately 2½ degrees of a circle, as in actual practice these dimensions have provided a head giving excellent results. The turbulence chamber 8 is of considerably greater capacity than the super-turbulence chamber 9, and I prefer to locate the spark plug 16 in the turbulence chamber adjacent the end of the super-turbulence chamber.

On the intake stroke of the piston the charge is drawn into the chamber 8 where the dome-shaped form creates considerable turbulence causing the fuel to roll upon itself at a relatively high rate. As the fuel passes through the chamber 9 to enter the cylinder, its direction of flow will be deflected, causing the fuel to roll upon itself in spiral stream lines at an angle to the direction of flow of the fuel in the chamber 8, and due to the fact that the fuel will enter the chamber 9 of smaller capacity from the chamber 8 of larger capacity, it will be drawn through at a very rapid rate (according to the rate of flow), so that the turbulence will be stepped up or increased materially, and upon the compression stroke of the piston the fuel will be caused to whirl rapidly to set up a very violent turbulence just at the time that the spark plug 16 will furnish the spark to ignite the charge, it being understood, of course, that both valves 3 and 4 at this time will be seated. Since the full force of the explosion will be directed upon the exact center of the piston at the time of maximum explosive effort, and in view of the fact that the lighter ends and the heavier ends are intimately mixed in a violent state of agitation, it will be apparent that efficiency of the combusted charge will be relatively high, and it will also be apparent that the scavenging stroke of the piston will set up a violent turbulence in the head while the exhaust valve 4 is unseated, to tend to dislodge any particles of combustion and to force out the burnt gases so that the space above the piston will be practically free from unburnt gases at the time the intake valve 3 opens to admit a fresh charge during the intake stroke of the piston.

In actual practice I have found that an engine constructed in accordance with my invention possesses many inherent advantages among which may be named practically lack of vibration, increase in power, practically freedom from carbon formations, and uniform power pulsations, thereby producing means for easily starting the engine and for maintaining it in operation at relatively low speeds, in a smooth-running manner.

I have also found that an engine constructed in accordance with my invention is especially free from fuel detonation with present-day low grade fuel.

What I claim and desire to secure by Letters-Patent is:—

1. In an internal combustion engine, a cylinder having a lateral extension, said extension being provided with inlet and exhaust ports, a cylinder head having an auxiliary combustion chamber above the inlet and exhaust ports, the auxiliary combustion chamber and the cylinder being in restricted communication, said head having an auxiliary conduit connecting the auxiliary chamber with said cylinder.

2. In an internal combustion engine, a cylinder having a lateral extension, said extension being provided with inlet and exhaust ports, a cylinder head having an auxiliary combustion chamber above the inlet and exhaust ports, valves for controlling said ports, the top of the extension and valves forming the bottom of the auxiliary combustion chamber, the auxiliary combustion chamber and the cylinder being in restricted communication, said head having an auxiliary conduit connecting the auxiliary chamber with said cylinder.

In testimony whereof I affix my signature.

ORA F. HAIBE.